United States Patent
Toy

(10) Patent No.: US 11,792,087 B1
(45) Date of Patent: Oct. 17, 2023

(54) SYSTEMS AND METHODS FOR AUTONOMOUS MANAGED SERVICES ORCHESTRATION

(71) Applicant: Verizon Patent and Licensing Inc., Basking Ridge, NJ (US)

(72) Inventor: Mehmet Toy, Allendale, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/051,723

(22) Filed: Nov. 1, 2022

(51) Int. Cl.
*H04L 41/40* (2022.01)
*G06F 9/455* (2018.01)
*H04W 48/18* (2009.01)
*H04W 24/10* (2009.01)

(52) U.S. Cl.
CPC .......... *H04L 41/40* (2022.05); *G06F 9/45558* (2013.01); *H04W 24/10* (2013.01); *H04W 48/18* (2013.01); *G06F 2009/45595* (2013.01)

(58) Field of Classification Search
CPC ....... H04L 41/40; H04L 41/12; H04L 41/122; H04L 41/342; G06F 9/45558; G06F 2009/45595; H04W 24/10; H04W 48/18
See application file for complete search history.

(56) References Cited

U.S. PATENT DOCUMENTS

| | | | |
|---|---|---|---|
| 11,206,195 B2 | 12/2021 | Toy | |
| 2016/0078342 A1* | 3/2016 | Tang | H04L 41/00 706/47 |
| 2016/0314022 A1* | 10/2016 | Pabari | H04L 67/1017 |
| 2020/0110638 A1* | 4/2020 | Asthana | H04L 67/51 |
| 2023/0080458 A1* | 3/2023 | Lok | H04L 12/4679 709/223 |

* cited by examiner

*Primary Examiner* — Frantz B Jean

(57) ABSTRACT

An orchestration system may receive, from a subscriber management system, a request indicating a subscriber intent for a connectivity service or a cloud service. The orchestration system may identify, based on subscriber information associated with the request, a managed service. The orchestration system may automatically discover subscriber network devices configured to access the managed service and configure network connectivity of the subscriber network devices. The orchestration system may allocate infrastructure and network resources for the managed service. The orchestration system may configure, based on the resources, infrastructure hardware components, software components, and applications of the managed service. The orchestration system may configure managed service components associated with the managed service. The orchestration system may connect the infrastructure hardware components, the software components, the applications, and the managed service components to service assurance systems. The orchestration system may activate the managed service for the subscriber network devices.

20 Claims, 10 Drawing Sheets

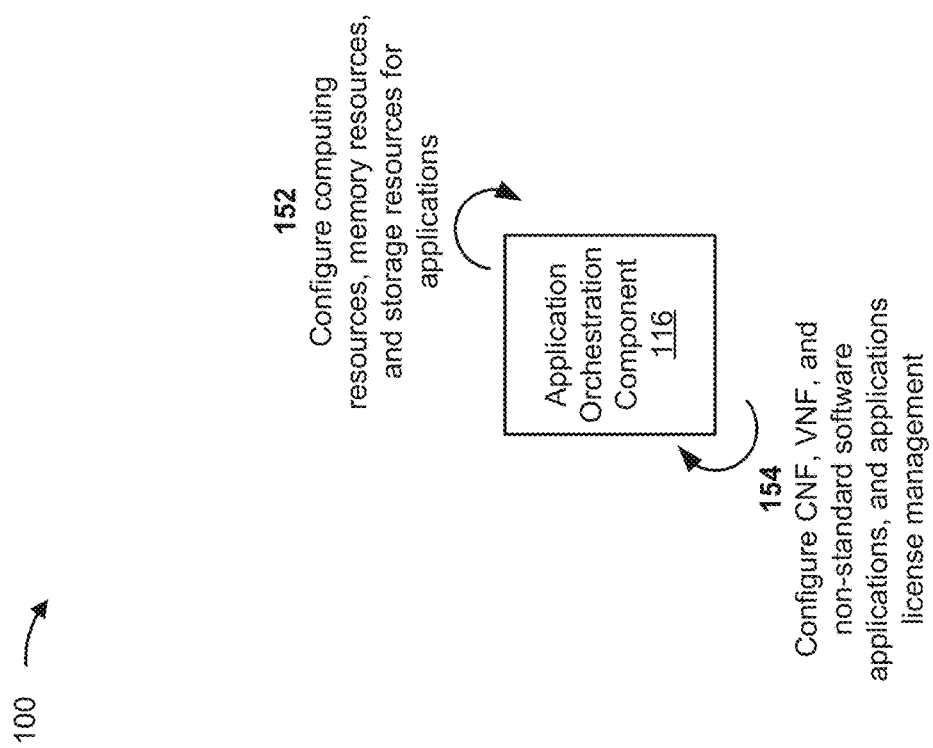

SYSTEMS AND METHODS FOR AUTONOMOUS MANAGED SERVICES ORCHESTRATION

BACKGROUND

Managed services comprise connectivity services and cloud services that provide connectivity and application hosting, that are either fully managed by service providers or co-managed by service providers and customers. Customers of managed Services are usually enterprises. Examples of e managed services are connectivity services such as Ethernet private line (EPL) and Ethernet private-local area network (EP LAN); virtual network services such as software-defined wide area network (SD-WAN); and cloud services such as infrastructure as a service (IaaS) and platform as a service (PaaS).

BRIEF DESCRIPTION OF THE DRAWINGS

FIGS. 1A-1G are diagrams of an example associated with autonomous managed services orchestration.

DETAILED DESCRIPTION OF PREFERRED EMBODIMENTS

Figure 1A:
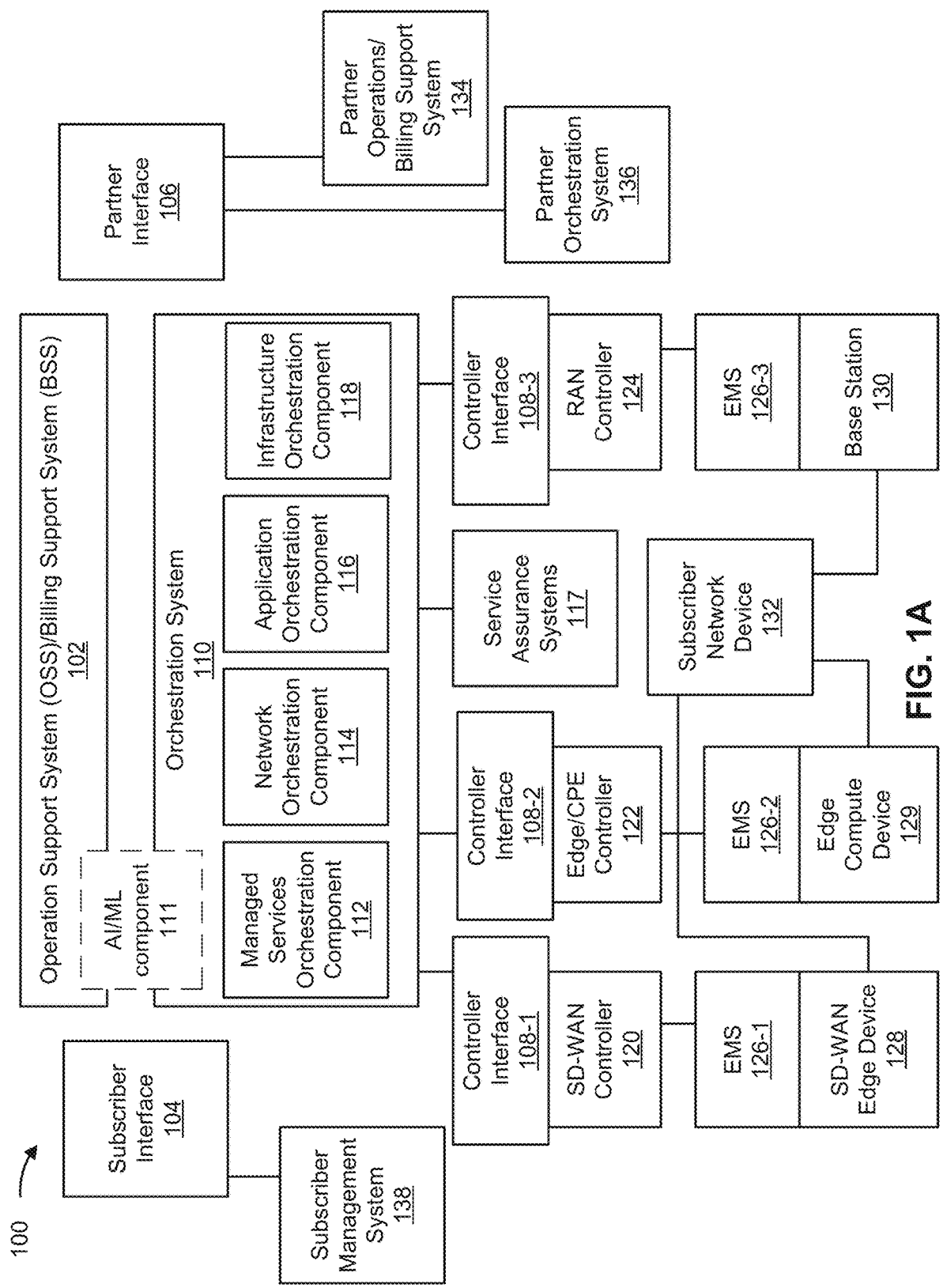

The following detailed description of example implementations refers to the accompanying drawings. The same reference numbers in different drawings may identify the same or similar elements.

Managed services may include just wired, wireless, satellite, and Internet connectivity components or both connectivity components and applications as in cloud services. Resources of a managed service provider, may be configured to provide connectivity services or cloud services. The connectivity services may establish end-to-end connections between devices, between devices and applications, and between applications. The cloud services may include providing connectivity services and providing applications. Configuring the managed services may include at least configuring hardware and/or software components of the network devices, and/or configuring infrastructure component such as computing, memory and storage resources for applications.

Currently, processes for ordering managed services, configuring the network devices and remaining components of managed services and performing service assurance functions are performed mostly manually by a managed service provider. For example, configuring the network devices manually is a time-consuming process. Additionally, configuring the network devices manually may cause the network devices to be configured improperly. Configuring the network devices improperly may result in the network devices being manually reconfigured multiple times. Reconfiguring the network devices in this manner consumes network resources, computing resources, and other resources.

Implementations described herein are directed to an orchestration architecture for autonomous managed services. For example, implementations described herein are directed to an orchestration system, of a managed service provider, that is configured to autonomously activate a managed service of the managed service provider. The orchestration architecture may include a managed services orchestration component, a network orchestration component, an application orchestration component, and an infrastructure orchestration component.

As an example, the managed services orchestration component may be configured to map an intent of a managed services subscriber to the managed service. The network orchestration component may be configured to configure network connectivity of the network devices. The application orchestration component may be configured to configure software applications of network functions associated with the managed service. The infrastructure orchestration component may be configured to configure hardware components and software components of the network devices.

As described herein, the orchestration system may allocate infrastructure and network resources for the managed service. Based on the allocated resources, the orchestration system may configure infrastructure hardware components, software components, and applications of the managed service. Additionally, or alternatively, the orchestration device may configure managed service components associated with the managed service. By configuring the components as described herein, the orchestration system may preserve network resources, computing resources, and other resources that would have been used to reconfigure network devices and/or applications when the network devices and/or applications are configured improperly.

FIGS. 1A-1G are diagrams of an example implementation 100 associated with autonomous managed services orchestration. As shown in FIGS. 1A-1G, example implementation 100 includes an operations and billing support system (OSS/BSS) 102 of a managed service provider, an orchestration system 110 of the managed service provider, an SD-WAN controller 120, an edge/customer premises equipment (CPE) controller 122, a radio access network (RAN) controller 124, an SD-WAN edge device 128, an edge compute device 129, a base station 130, a subscriber network device 132, a partner operations/billing support system 134, a partner orchestration system 136, and a subscriber management system 138. These devices are described in more detail below in connection with FIG. 2 and FIG. 3.

OSS/BSS 102 may include one or more devices (e.g., servers) configured to perform functions relating to intent mapping based on business intent (e.g., financial requiring strict performance, web access requiring best effort performance, etc.) requested by subscriber management system 138s; relating to providing information regarding managed services provided by the managed service provider; relating to ordering, delivery, and billing of managed services; relating to negotiating licensing associated with the managed service applications; and/or relating to requests, from subscriber network device 132, for connectivity services and/or cloud services, among other examples. With respect to providing the information regarding the managed services, OSS/BSS 102 may provide a services catalog. In some examples, an interface may be provided between OSS/BSS 102 and partner operations/billing support system 134.

With respect to intent mapping, Orchestration 110 may be configured to map an intent of a subscriber to a managed service. For example, Orchestration 110 may be configured to determine (or predict) a managed service that may be used to provide the application requested by subscriber management system 138. The intent may be identified in a request from subscriber management system 138, or identified in subscriber information regarding the subscriber, among other examples. The interface between Orchestration systems may enable functions relating to provisioning, fault (or failure) detection, testing, and performance management relating to the services such as connectivity and cloud services.

Orchestration system 110 may include one or more devices (e.g., servers) configured to perform functions relating to intent mapping (as explained above); relating to configuring network devices to provide connectivity services such as E-Line and SD-WAN or connectivity and application using a managed service; relating to predicting a failure of the network devices; relating to evaluating performance of the network devices; relating to predicting an amount of resources associated with the network devices providing access to the application; and/or relating to maintaining a level of security for the network devices (e.g., secure access service edge solutions, zero trust security policy), among other examples.

As shown in FIG. 1A, orchestration system 110 may include a managed services orchestration component 112, a network orchestration component 114, an application orchestration component 116, and an infrastructure orchestration component 118. Managed services orchestration component 112 may be configured to perform functions relating to intent mapping of an intent of the subscriber to one or more managed services, as described herein. The intent mapping may be performed using one or more artificial intelligence/machine learning models controlled by the AI/ML component 111 (hereinafter "AI/ML component 111"). As shown in FIG. 1A, OSS/BSS 102 and/or orchestration system 110 may use AI/ML component 111. Network orchestration component 114 may be configured to perform functions relating to network connectivity of network devices using AI/ML component 111, as described herein. The network connectivity may include wired connectivity and/or wireless connectivity and/or satellite connectivity.

Application orchestration component 116 may be configured to perform functions relating to configuring software applications of network functions (or software implementations of network functions) and third-party applications; and predict future capacity and possible failures using AI/ML, component 111, as described herein. The software applications of network functions may include cloud-native network functions (CNFs) and virtual network functions (VNFs). Infrastructure orchestration component 118 may be configured to perform functions relating to configuring hardware components and software components of network devices; and predict future capacity and possible failures using AI/ML, component 111, as described herein. The network devices may include customer premises equipment (CPE), universal CPEs, Edge devices, and/or Multi-access Edge Computing (MEC) devices, among other examples. The hardware components and software components may include virtual machines, containers, and/or cloud platforms, among other examples.

As shown in FIG. 1A, a subscriber interface 104 may be provided between systems of the managed service provider (e.g., OSS/BSS 102 and orchestration system 110) and a subscriber management system 138. In some examples, subscriber interface 104 may be an application program interface (API). The managed services may include computing resources, storage resources, applications, and/or network resources (e.g., connectivity), among other examples, that may be accessed by subscriber network device 132. In some implementations, the managed services may include connectivity and application functionalities with operational flexibility with respect to service ordering, provisioning, monitoring, and/or billing.

Subscriber interface 104 may be configured to enable provisioning and dynamic modifications of services provided to subscriber network device 132. Additionally, or alternatively, subscriber interface 104 may be configured to enable the configuration, the testing, intent mapping, and/or the capacity and failure predictions of all service components including subscriber network device 132. Additionally, or alternatively, subscriber interface 104 may be configured to enable ordering and billing of the managed services.

Subscriber interface 104 may enable subscriber network device 132 to connect to and operate over cloud platforms, and/or connect and execute applications provided by the managed service provider, among other examples. Subscriber interface 104 may enable subscriber network device 132 to access an application (e.g., a managed application) provided by the managed service provider.

Figure 1B:
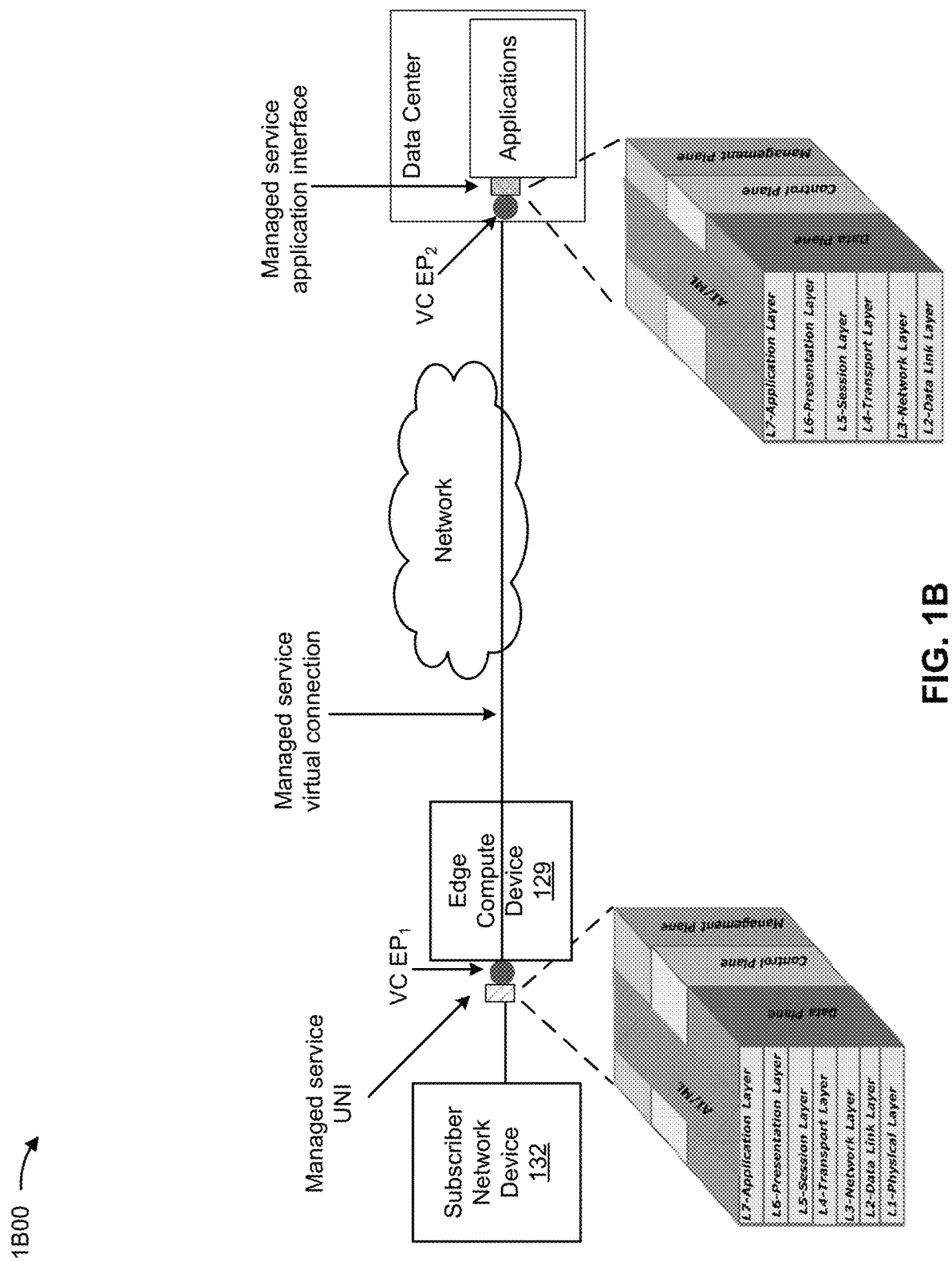

Referring to FIG. 1B, a managed service virtual connection may be established between subscriber network device 132 and applications hosted by a data center. The managed service virtual connection may be established via edge compute device 129 and via a network (e.g., the Internet). As shown in FIG. 1B, a managed service user-to-network interface (UNI) may be provided between subscriber network device 132 and edge compute device 129. The managed service UNI may support Layer 1 (L1 or physical layer), Layer 2 (L2 or data link layer), Layer 3 (L3 or network layer), Layer 4 (L4 or transport layer), Layer 5 (L5 or session layer), Layer 6 (L6 or presentation layer), and/or Layer 7 (L7 or application layer) protocols in the data plane, the control plane, and/or the management plane along with AI/ML plane for prediction of capacity and failures related to the managed service.

In some situations, a first end of the managed service virtual connection may be connected to a first managed service VC endpoint (VC $EP_1$) and a second end of the managed service virtual connection may be connected to a second managed service VC endpoint (VC $EP_2$). The second managed service VC endpoint may be terminated at a managed service application interface. The managed service application interface may support Layer 2 (L2 or data link layer), Layer 3 (L3 or network layer), Layer 4 (L4 or transport layer), Layer 5 (L5 or session layer), Layer 6 (L6 or presentation layer), and/or Layer 7 (L7 or application layer) protocols in the data plane, the control plane, and/or the management plane along with AI/ML plane for prediction of capacity and failures related to the application.

Referring back to FIG. 1A, a partner interface 106 may be provided between the systems of the managed service provider and systems of a partner (e.g., partner operation support system 134 and partner orchestration system 136). The term "partner" may be used to refer to a cloud operator, a network operator, another managed service provider, and/or a network service provider, among other examples. In some examples, partner interface 106 may be an API. Partner interface 106 may be configured to enable provisioning, dynamic modifications, service assurance, and testing of cloud services provided by the systems of the partner. Additionally, or alternatively, partner interface 106 may be configured to enable quoting, ordering and billing of the managed services.

In some implementations, partner operation support system 134 may include components similar to OSS/BSS 102 and may be perform functions similar to functions performed by OSS/BSS 102. Additionally, or alternatively, partner orchestration system 136 may include components similar to orchestration system 110 and may be perform functions similar to functions performed by orchestration system 110.

As shown in FIG. 1A, a plurality of controller interfaces 108 may be provided between orchestration system 110 and multiple controllers. Controller interfaces 108 are referred to individually as "controller interface 108." Controller interfaces 108 may enable orchestration system 110 to provide instructions to the controllers to cause the controllers to control operations of multiple devices. In some examples, a controller interface 108-1 may be provided between orchestration system 110 and SD-WAN controller 120, a controller interface 108-2 may be provided between orchestration system 110 and edge/CPE controller 122, and a controller interface 108-3 may be provided between orchestration system 110 and a RAN controller 124. In some instances, edge/CPE controller 122 may be a federation manager. For example, as the federation manager, edge/CPE controller 122 may be associated with MEC devices 129 and may control operations of MEC devices 129.

As shown in FIG. 1A, element management system (EMS) 126 may be provided between the controllers and devices controlled by the controllers. EMSs 126 are referred to individually as "EMS 126." The devices may include SD-WAN edge device 128, an edge compute device 129, and base station 130. In some implementations, a controller may be associated with multiple EMSs. Accordingly, the controller may be associated with multiple EMSs 126. For example, SD-WAN controller 120 may be associated with multiple EMSs 126 and each EMS 126 may be associated with a respective SD-WAN edge device, such as SD-WAN edge device 128.

As shown in FIG. 1A, orchestration system 110 may be connected to service assurance systems 117. In some examples, service assurance systems 117 may include a fault management system, a performance management system, and a testing system, as explained herein. The fault management system receives failure event notifications and threshold crossing alerts either directly from subscriber network devices 132 or from the EMS and controller combination. From these events, the fault management system identifies the faulty component and cause of the failure, and generates a trouble ticket for manual or auto fixes. The performance management system collects measurements on-demand or periodically either directly from devices or the EMS and controller combination and store them for shorter time interval such as 8 hrs or 24 hrs and longer time intervals such as weeks and months. These measurements could be throughput, delay, jitter and loss measurements for virtual connections to determine if service performance measurements within or outside service level agreement bounds. The test systems perform out-of-service testing before activating the service and trouble isolation during failures and in-service testing periodically without impacting the service to monitor service performance.

Figure 1C:
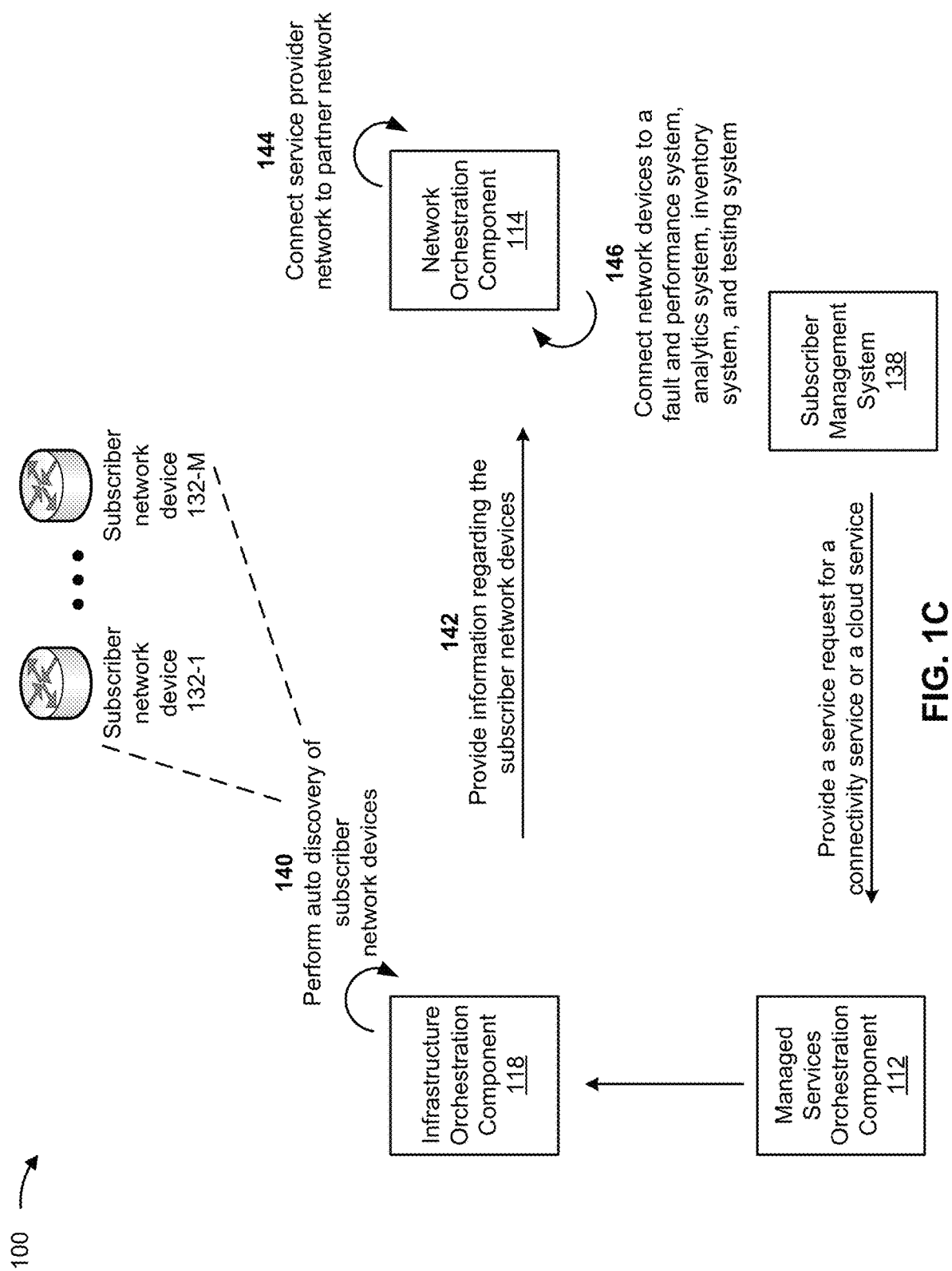

As shown in FIG. 1C, and by reference number 140, infrastructure orchestration component 118 may perform auto discovery of subscriber network devices. For example, infrastructure orchestration component 118 may perform auto discovery to discover subscriber network devices 132 of the subscriber when the device is connected to the service provider network by the subscriber. In some examples, a subscriber management system 138 may provide a service request for a connectivity service or a cloud service.

The connectivity service may establish connectivity for devices of the subscriber. The cloud service may provide access to an application via the connectivity established using the connectivity service. The service request may be provided to the managed services orchestration component 112. Based on the service request, managed services orchestration component 112 may provide a discovery request to discover subscriber network devices 132 of the subscriber. The discover request may be provided to infrastructure orchestration component 118. Based on the discover request, infrastructure orchestration component 118 may discover subscriber network devices 132.

In some implementations, infrastructure orchestration component 118 may discover subscriber network devices 132 based on information identifying subscriber network devices 132. In some examples, the information identifying subscriber network devices 138 may be stored in a memory associated with orchestration system 110. The information identifying subscriber network devices 132 may include serial numbers of subscriber network devices 132 and/or network addresses of subscriber network devices 132 (e.g., media access control addresses).

In some implementations, subscriber network devices 132 may include CPEs, universal CPEs consisting of virtualized platform, and/or MEC devices, among other examples. When implementing zero trust policy, infrastructure orchestration component 118 authenticates, authorizes, and continuously validates users before being granted access to, or maintain access to, or perform operations on automatically discovered subscriber network device 132. In some examples, the process of auto discovery may be performed using SD-WAN controller 120 and one or more EMSs associated with SD-WAN controller 120.

In some implementations, when performing auto discovery, infrastructure orchestration component 118 may discover Internet-of-Things (IoT) devices associated with the managed service provider. In some implementations, the auto discovery of subscriber network devices may be performed by infrastructure orchestration component 118 in conjunction with network orchestration component 114. Alternatively, the auto discovery of subscriber network devices may be performed by network orchestration component 114.

As shown in FIG. 1C, and by reference number 142, infrastructure orchestration component 118 may provide information regarding the subscriber network devices to network orchestration component 114. For example, infrastructure orchestration component 118 may provide the information identifying subscriber network devices 132 and/or information identifying the IoT devices to network orchestration component 114 to cause network orchestration component 114 to configure network connectivity of subscriber network devices 132 and the IoT devices.

As shown in FIG. 1C, and by reference number 144, network orchestration component 114 may connect a service provider network of the service provider and a partner network of the partner. For example, network orchestration component 114 may establish a managed service external network-to-network interface (ENNI) between the service provider network of the managed service provider and the partner network of the partner. The managed service ENNI may support Layer 1, Layer 2, Layer 3, Layer 4, Layer 5, Layer 6, and/or Layer 7 protocols in the data plane, the control plane, and/or the management plane along with AI/ML prediction of capacity and failures related to the cloud services, in a manner similar to the manner described above in connection with the managed service UNI of FIG.

1B. The AI/ML component 111 can be used by OSS/BSS 102 and Orchestration System 110 in mapping subscriber intent from subscriber management system 138 to services.

In some implementations, network orchestration component 114 may configure access and network ports of subscriber network devices 132 to access the service provider network. Additionally, or alternatively, network orchestration component 114 may configure network connectivity of subscriber network devices 132 to the service provider network. For example, network orchestration component 114 may configure local area network (wired and/or wireless) connectivity of subscriber network devices 132, may configure cellular (e.g., LTE, 5G) connectivity of subscriber network devices 132, may assign Internet protocol (IP) addresses to subscriber network devices 132, may configure wi-fi connectivity of the network devices 132, may configure passive optical network connectivity associated with subscriber network devices 132, may configure Ethernet connectivity, may configure SD-WAN connectivity, may configure private Internet protocol (PIP) services, and/or may configure public Internet connectivity, among other examples.

Network orchestration component 114 may configure connectivity of subscriber network devices 132 to the partner network of the partner. In some examples, configuring the connectivity to the partner network of the partner may include establishing an ENNI gateway, establishing a security gateway, and establishing an API gateway for communicating with the orchestration system of the partner 136 to perform service configuration and service assurance functions (i.e., fault management, performance management, testing, analytics, etc.).

As shown in FIG. 1C, and by reference number 146, network orchestration component 114 may connect all networking components associated with the service including the subscriber network devices if managed by service provider to a fault and performance system, an analytic system, an inventory system, and a testing system of the service provider. For example, network orchestration component 114 may connect subscriber network devices 132 and the IoT devices to the fault and performance system (e.g., to service assurance systems 117) for the purpose of capacity and fault prediction. For example, using the fault and performance system, network orchestration component 114 may determine future capacity (or quantity) of network paths, IP addresses, and/or virtual local area network (VLAN) identifiers that may be needed to enable the network connectivity of subscriber network devices 132 and the IoT devices to the network, by using AI/ML, techniques. Additionally, or alternatively, using the fault and performance system, network orchestration component 114 may predict future failures or determine the failed network components such as switching and routing ports and network links associated with the connectivity of subscriber network devices 132 and the IoT devices.

In some implementations, network orchestration component 114 may predict failures of the ports and the network links based on a current amount of traffic provided via the ports and the network links and/or based on an anticipated amount of traffic to be provided via the ports and the network links, among other examples. Network orchestration component 114 may be configured to identify the ports and the network links that are predicted to fail and initiate failure recovery procedures and/or configure the ports and the network links to address the failure.

In some implementations, using the analytic system, network orchestration component 114 may perform different types of analytics on subscriber network devices 132. For example, data (used to perform the analytics) may be obtained over a period of time during which the connectivity service or the cloud service is provided to subscriber network devices 132. In some implementations, using the inventory system, network orchestration component 114 may maintain an inventory of subscriber network devices 132 (e.g., maintain information regarding a quantity of subscriber network devices 132 utilized for the connectivity service or the cloud service), an inventory of network 220 and applications 242. In some implementations, using the testing system, network orchestration component 114 may perform testing of subscriber network devices 132, network 220, and applications 242 to evaluate a performance of subscriber network devices 132 and the services over the period of time.

Figure 1D:
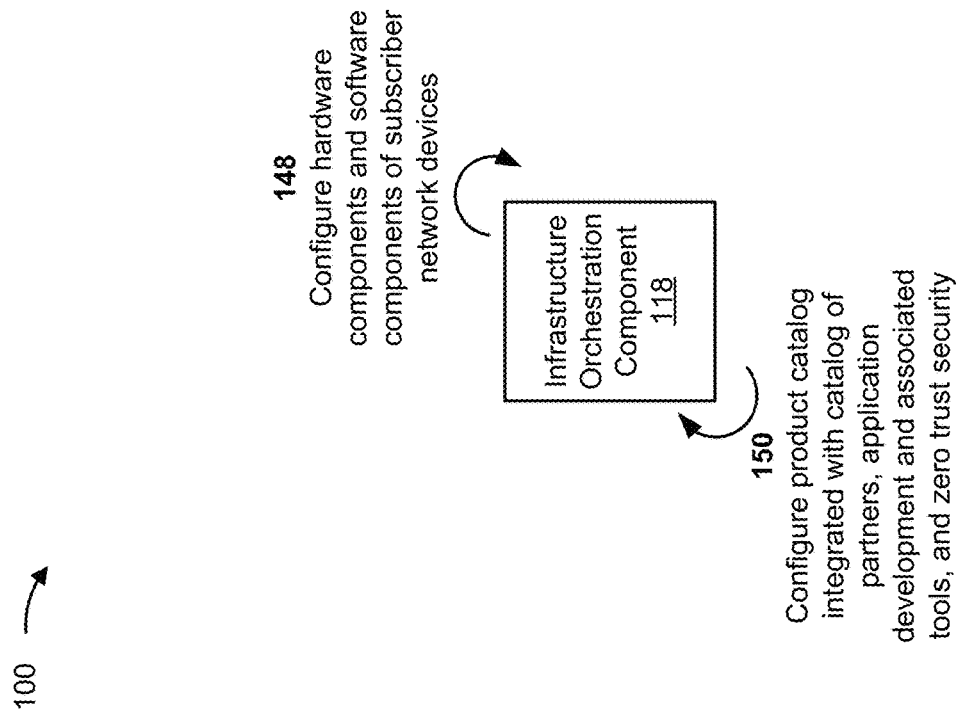

As shown in FIG. 1D, and by reference number 148, infrastructure orchestration component 118 may configure hardware components and software components of network devices. In some implementations, when configuring the hardware components, infrastructure orchestration component 118 may configure central processing units of subscriber network devices 132, network 220, and/or may configure memories of subscriber network devices 132 (e.g., random access memories), network 220, applications 242, among other examples.

In some implementations, when configuring the software components, infrastructure orchestration component 118 may configure virtualization platforms of network 220, data center 240, subscriber network devices 132, may configure containers as part of a Kubernetes cluster, and/or may configure virtual machines, among other examples. Additionally, network 220, data centers 240, and subscriber network devices 132 may implement a zero trust security policy.

In some implementations, using the fault and performance system, network orchestration component 114 may predict a capacity of the hardware components and of the software components. Network orchestration component 114 may predict the capacity based on information regarding utilization of network 220 and subscriber network devices 132 (e.g., historical information regarding utilization of network 220 and subscriber network devices 132 and/or information regarding anticipated utilization of network 220 and subscriber network devices 132, among other examples). Similarly, Infrastructure orchestration component 118 may predict the capacity based on information regarding utilization of Data Center 230.

For example, when predicting the capacity, network orchestration component 114 may predict port, routing table, and ENNI GW capacities of network 220, a quantity of central processing units, a quantity of memories, storage units, a quantity of containers, and/or a quantity of virtual machines, among other examples.

For example, when predicting the capacity, infrastructure orchestration component 118 may predict a quantity of central processing units, a quantity of memories, storage units for Data Center 230.

For example, when predicting the capacity, application orchestration component 116 may predict a quantity of central processing units and a quantity of memories for applications 242.

For example, when predicting the capacity, service orchestration component 112 may predict number of managed service UNIs, virtual connections, and virtual connection end points.

In some implementations, using the fault and performance system, network orchestration component 114 may predict a failure of the network hardware components and/or of the software components associated with network 220 and subscriber network device 132. Network orchestration component 114 may predict the failure based on a temperature of each subscriber network devices 132 and each component of network 220; and/or based on a quantity of packet delay and loss associated with each component of network 220 and each subscriber network devices 132, among other examples. For example, network orchestration component 114 may predict the failure of a subscriber network devices 132 when the temperature of the subscriber network devices 132 and/or a component of network 220 satisfies a temperature threshold frequently. Additionally, or alternatively, network orchestration component 114 may predict the failure of the subscriber network devices 132 and components of network 220 when the quantity of packet loss associated with the subscriber network devices 132 and/or a component of network 220 satisfies a quantity threshold frequently. In some examples, network orchestration component 114 may configure the hardware components and the software components to address the failure. Additionally, or alternatively, network orchestration component 114 may identify other software components, other hardware components, and/or other subscriber network devices 132 to address the failure.

As shown in FIG. 1D, and by reference number 150, infrastructure orchestration component 118 may configure a product catalog integrated with a catalog of partner, application development and associated tools, and zero trust security. In some implementations, infrastructure orchestration component 118 may identify managed services provided by the managed service provider. Additionally, or alternatively, infrastructure orchestration component 118 may identify managed services provided by the cloud operator and import information regarding the managed services provided by the cloud operator. Infrastructure orchestration component 118 may combine information regarding the managed service provided by the managed service provider and the information regarding the managed services provided by the partner operators into the product catalog. The product catalog may be provided to subscribers. For example, the product catalog may be provided to the subscriber via subscriber management system 138.

Infrastructure orchestration component 118 may prepare tools and storage resources for development and integration of managed services and applications of the managed services provider. Infrastructure orchestration component 118 may implement a zero trust security policy when importing the information regarding the managed services provided by the partner and when preparing the tools and the storage resources discussed above.

As shown in FIG. 1E, and by reference number 152, application orchestration component 116 may configure computing resources, memory resources, and storage resources for applications 242. For example, application orchestration component 116 may configure virtual central processing units for software applications of network functions (or software implementations of network functions) associated with the applications. Additionally, or alternatively, application orchestration component 116 may configure memories (e.g., random access memories) and storage for networking and processing functions associated with the applications 242. The software applications of the network functions may include CNFs and VNFs.

As shown in FIG. 1E, and by reference number 154, application orchestration component 116 may perform configuration for CNFs, VNFs, non-standard software applications, and applications license management. For example, application orchestration component 116 may configure networking functionalities for the software applications of network functions (e.g., CNFs and/or VNFs). Additionally, or alternatively, application orchestration component 116 may configure licenses associated with the use of the software applications.

In some implementations, application orchestration component 116 may connect applications including CNFs and VNFs to the fault and performance system. Using the fault and performance system, application orchestration component 116 along with AI/ML component 111 may predict future resources required and possible failures for applications. In some examples, application orchestration component 116 may determine the failure based on information regarding the protocol data unit (PDU) delay and loss of applications. Based on the type of failure, orchestration system 110 components may identify hardware, software, and virtualization components associated with the failure and configure them to address the failure.

In some examples, application orchestration component 116 may establish a connection with a device of the partner to onboard software applications of network functions (e.g., CNFs and VNFs) of the managed services provider (hereinafter "managed services network functions"). Application orchestration component 116 may configure the managed services network functions of the partner in a manner similar to the manner described above.

Figure 1F:
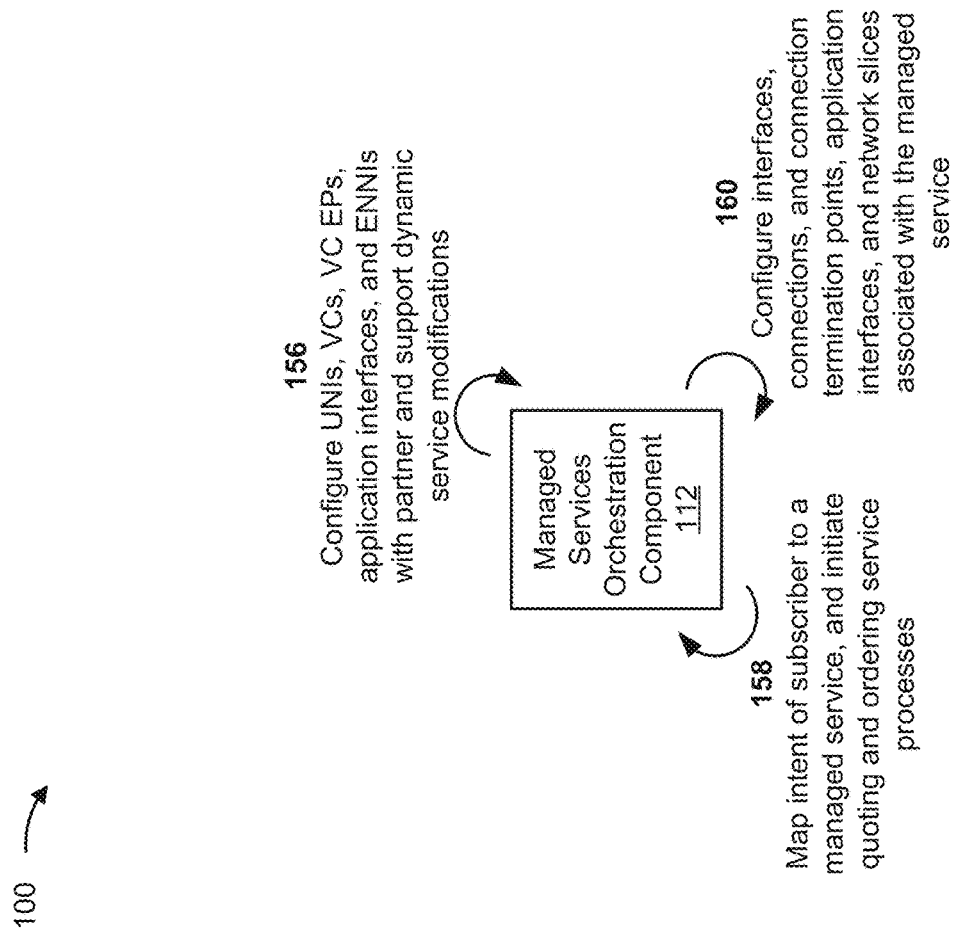

As shown in Fig. 1F, and by reference number 156, managed services orchestration component 112 may configure UNIs, VCs, VC Eps, application interfaces, and ENNIs with partners; and support dynamic service modifications (i.e., elasticity). For example, managed services orchestration component 112 may establish and configure the interfaces described herein. Managed services orchestration component 112 may establish and configure the interfaces to enable communications with subscriber network device 132 and applications of the partner. Additionally, the interfaces may enable the implementation of dynamic changes to managed services being provided to subscriber network device 132.

For example, in some instances, after the connectivity service has been provided to the subscriber (e.g., via subscriber network devices 132), the subscriber may desire and request the cloud service. Conversely, after the cloud service has been provided to the subscriber (e.g., via subscriber network devices 132), the subscriber may desire and request the connectivity service. The dynamic changes may include a change of services (e.g., a change from the connectivity service to the cloud service and/or a change from the cloud service to the connectivity service), modifications to service attributes such as connection bandwidth, connection class of service, adding or removing VNF/CNF in a service chain. The interfaces may include user interface/APIs (e.g., subscriber interface 104) for communicating with orchestration system 110, interoperability APIs (e.g., partner interface 106) for communicating with the systems of the partner, and/or elasticity APIs, among other examples.

As shown in Fig. 1F, and by reference number 158, OSS/BSS 102 and managed services orchestration component 112 may map intent of the subscriber to a managed service and may initiate quoting and ordering services processes. In some implementations, managed services orchestration component 112 may map the intent of the subscriber (of subscriber management system 138) to the managed service based on analysis of the information regarding the connectivity (identified by the service request), analysis of the information regarding the application (identified by the service request) and/or analysis of subscriber information of the subscriber, among other examples.

In other words, managed services orchestration component 112 may predict the managed service the subscriber may use based on the information regarding the connectivity, the information regarding the application and/or the subscriber information. As an example, managed services orchestration component 112 may predict the managed service using AI/ML, component 111. In some instances, managed services orchestration component 112 may analyze the request using a natural language processing algorithm to map the intent to the managed service. The subscriber information may include historical data regarding services accessed by subscriber network device 132, regarding connection bandwidth associated with the services, regarding service level agreements associated with the services, and regarding application associated with the services.

In some examples, managed services orchestration component 112 may allocate resources for the managed service. For instance, managed services orchestration component 112 along with AI/ML 111 may predict a capacity associated with the managed service. For example, managed services orchestration component 112 may determine a service level agreement associated with the managed service requested by the subscriber. The service level agreement may provide information regarding acceptable delay, acceptable jitter, and/or acceptable packet loss, among other examples. Managed services orchestration component 112 may allocate resources that enable the managed service to be provided in accordance with the service level agreement. Managed services orchestration component 112 may allocate infrastructure and network resources for the managed service. Managed services orchestration component 112 may identify application characteristics, connectivity characteristics, and the managed service that can support the service level agreement.

After mapping the intent, OSS/BSS 102 may initiate a quoting process to generate a quote associated with the managed service. The quote may a cost associated with utilizing the managed service. The OSS/BSS 102 may provide the quote to the subscriber. Based on receiving an approval of the quote, the OSS/BSS 102 may initiate an ordering service process to initiate ordering the managed service.

Figure 1G:
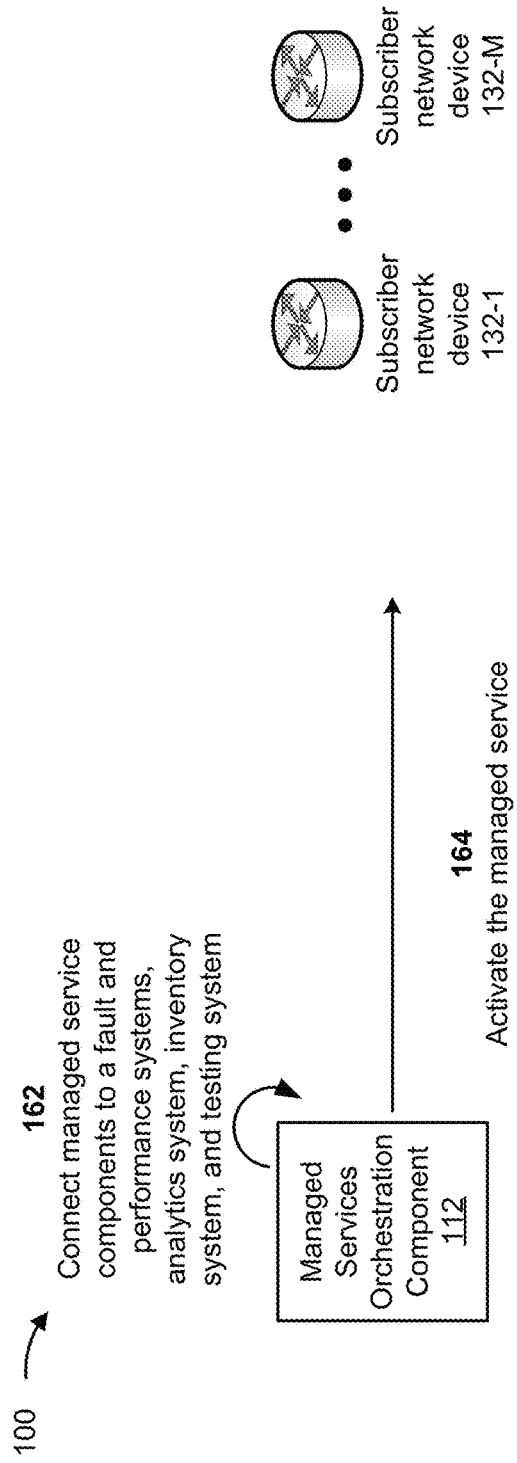

As shown in FIG. 1G, and by reference number 160, managed services orchestration component 112 may configure interfaces, connections, connection termination points, application interfaces, and network slices associated with the managed service. For example, managed services orchestration component 112 may configure a managed service VC along with VC end points of the managed service VC. Additionally, or alternatively, managed services orchestration component 112 may configure one or more network slices for the managed service. The interfaces, connections, connection termination points, application interfaces, and network slices may be referred to as "managed service components."

As shown in FIG. 1G, and by reference number 162, managed services orchestration component 112 may connect the managed service components to the fault and performance system, the analytic system, the inventory system, and the testing system. For example, the managed service components may be connected to the fault and performance system, the inventory system, and the testing system (e.g., service assurance systems 117) in a manner similar to the manner described above in connection with reference number 146 of FIG. 1C.

As shown in FIG. 1G, and by reference number 164, managed services orchestration component 112 may activate the managed service. For example, the managed service may be activated as a result of configuring the managed service components as described above. By activating the managed service, managed services orchestration component 112 may enable the one or more subscriber network devices 132 to access to the managed service.

As described herein, orchestration system 110 may allocate infrastructure and network resources for the managed service. Based on the allocated resources, orchestration system 110 may configure infrastructure hardware components, software components, and applications of the managed service. Additionally, or alternatively, the orchestration device may configure managed service components associated with the managed service. By configuring the components as described herein, the orchestration device may preserve network resources, computing resources, and other resources that would have been used to reconfigure network devices and/or applications when the network devices and/or applications are configured improperly.

Managed services may involve strict service-level agreements (SLAs). For example, the SLAs may identify strict requirements with respect to quality of service regarding connectivity services and/or cloud services associated with managed services. For instance, the SLAs may identify strict requirements regarding acceptable availability, acceptable delay, acceptable jitter, and/or acceptable packet loss, among other examples. Additionally, managed services may involve a wide range bandwidth which may impact application locations and network options. In some examples, managed services may involve edge devices and/or cloud operator devices, among other examples. Resources may be shared among the edge devices and the cloud operator devices. Managed services may support applications, VNFs, CNFs, and AI/ML algorithm development environments. With respect to network security, managed services may implement secure access service edge solutions and a zero trust policy. Orchestration system 110 described herein may be used for the configuration and other management functions of managed services.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
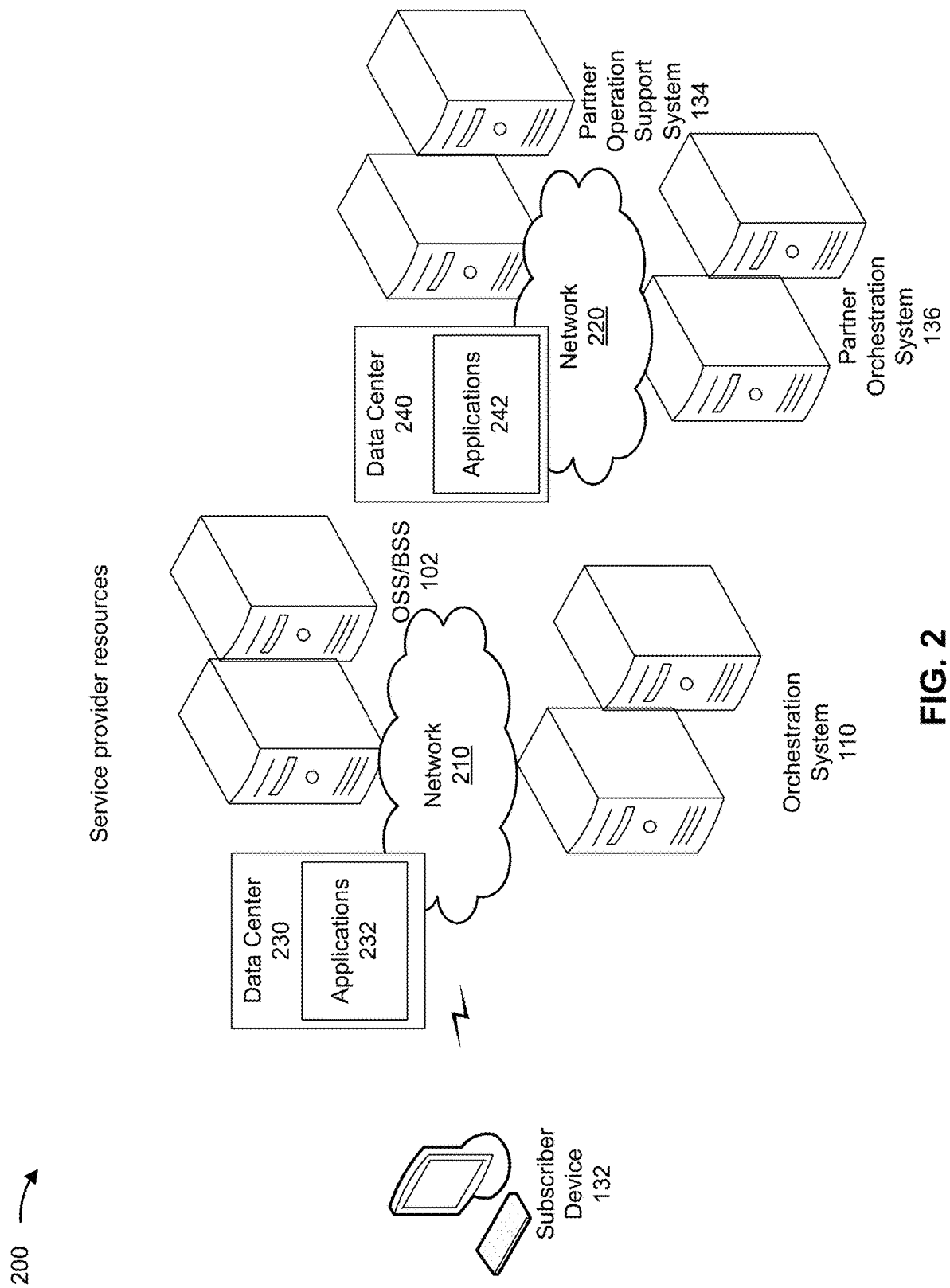
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include OSS/BSS 102, orchestration system 110, subscriber network device 132, partner operation support system 134, and partner orchestration system 136. As shown in FIG. 2, OSS/BSS 102 and orchestration system 110 are included for the management of network 210, data center 230 and applications 232. As shown in FIG. 2, partner operation support system 134 and partner orchestration system 136 are included for the management of network 220, data center 240, and applications 242. In some implementations, a managed service ENNI may be established between network 210 and network 220.

OSS/BSS 102 includes one or more devices capable of receiving, generating, storing, processing, providing, and/or routing information associated with autonomous managed services, as described elsewhere herein. OSS/BSS 102 may include a communication device and/or a computing device. For example, OSS/BSS 102 may include a server, such as an application server, a client server, a web server, a database server, a host server, a proxy server, a virtual server (e.g., executing on computing hardware), or a server in a cloud computing system. In some implementations, OSS/BSS 102 includes computing hardware used in a cloud computing environment. Orchestration system 110 may include one or more devices similar to OSS/BSS 102.

Subscriber network device 132 includes one or more devices capable of receiving, generating, storing, processing, and/or providing information associated with autonomous managed services, as described elsewhere herein. Subscriber network device 132 may include a communication device and a computing device. For example, subscriber network device 132 may include a wireless communication device, a mobile phone, a user equipment, a laptop computer, a tablet computer, a desktop computer, or a similar type of device.

Partner operation support system 134 includes one or more devices capable of receiving, generating, storing, processing, providing, and/or routing information associated with autonomous managed services, as described elsewhere herein. Partner operation support system 134 may include a communication device and/or a computing device. For example, partner operation support system 134 may include a server, such as an application server, a client server, a web server, a database server, a host server, a proxy server, a virtual server (e.g., executing on computing hardware), or a server in a cloud computing system. In some implementations, partner operation support system 134 includes computing hardware used in a cloud computing environment. Partner orchestration system 136 may include one or more devices similar to partner operation support system 134.

Network 210 includes one or more wired and/or wireless networks. For example, network 210 may include a cellular network, a public land mobile network (PLMN), a local area network (LAN), a wide area network (WAN), a private network, the Internet, and/or a combination of these or other types of networks. Network 210 enables communication among the devices of environment 200. As shown in FIG. 2, a data center 230 may be included in network 210. In some implementations, data center 230 may be capable of receiving, generating, storing, processing, providing, and/or routing information associated with autonomous managed services, among other examples. For example, data center 230 may store information regarding applications associated with connectivity services and/or cloud services. Additionally, data center 230 may be capable of hosting one or more applications 242.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. Network 220 enables communication among the devices of environment 200. As shown in FIG. 2, a data center 240 may be included in network 220. In some implementations, data center 240 may be capable of receiving, generating, storing, processing, providing, and/or routing information associated with autonomous managed services, among other examples. For example, data center 240 may store information regarding applications associated with connectivity services and/or cloud services. Additionally, data center 240 may be capable of hosting one or more applications 242.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
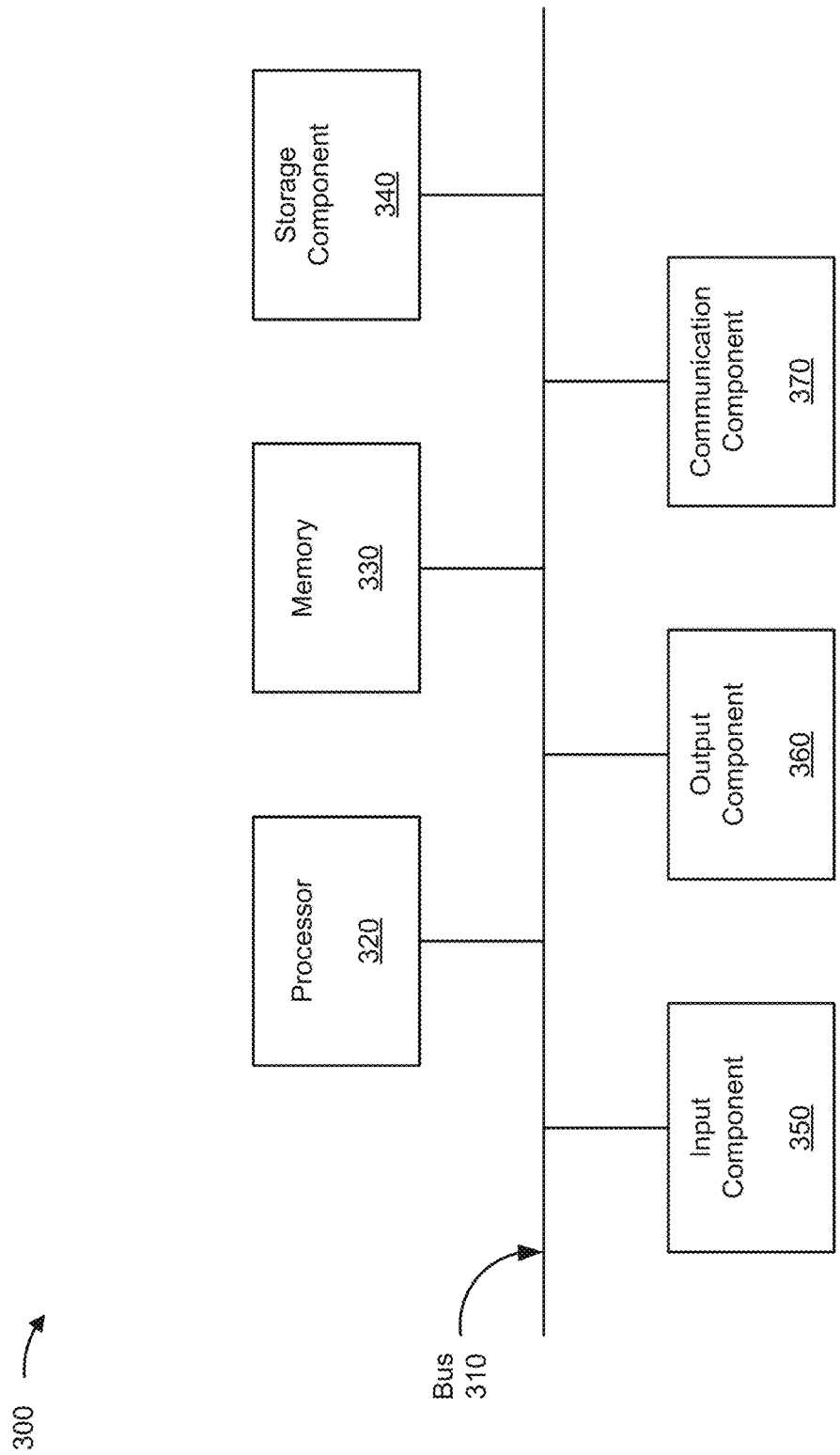
FIG. 3 is a diagram of example components of one or more devices of FIG. 2.

FIG. 3 is a diagram of example components of a device 300, which may correspond to OSS/BSS 102, orchestration system 110, subscriber network device 132, partner operation support system 134, partner orchestration system 136, and/or subscriber management system 138. In some implementations, OSS/BSS 102, orchestration system 110, subscriber network device 132, partner operation support system 134, partner orchestration system 136, and/or subscriber management system 138 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
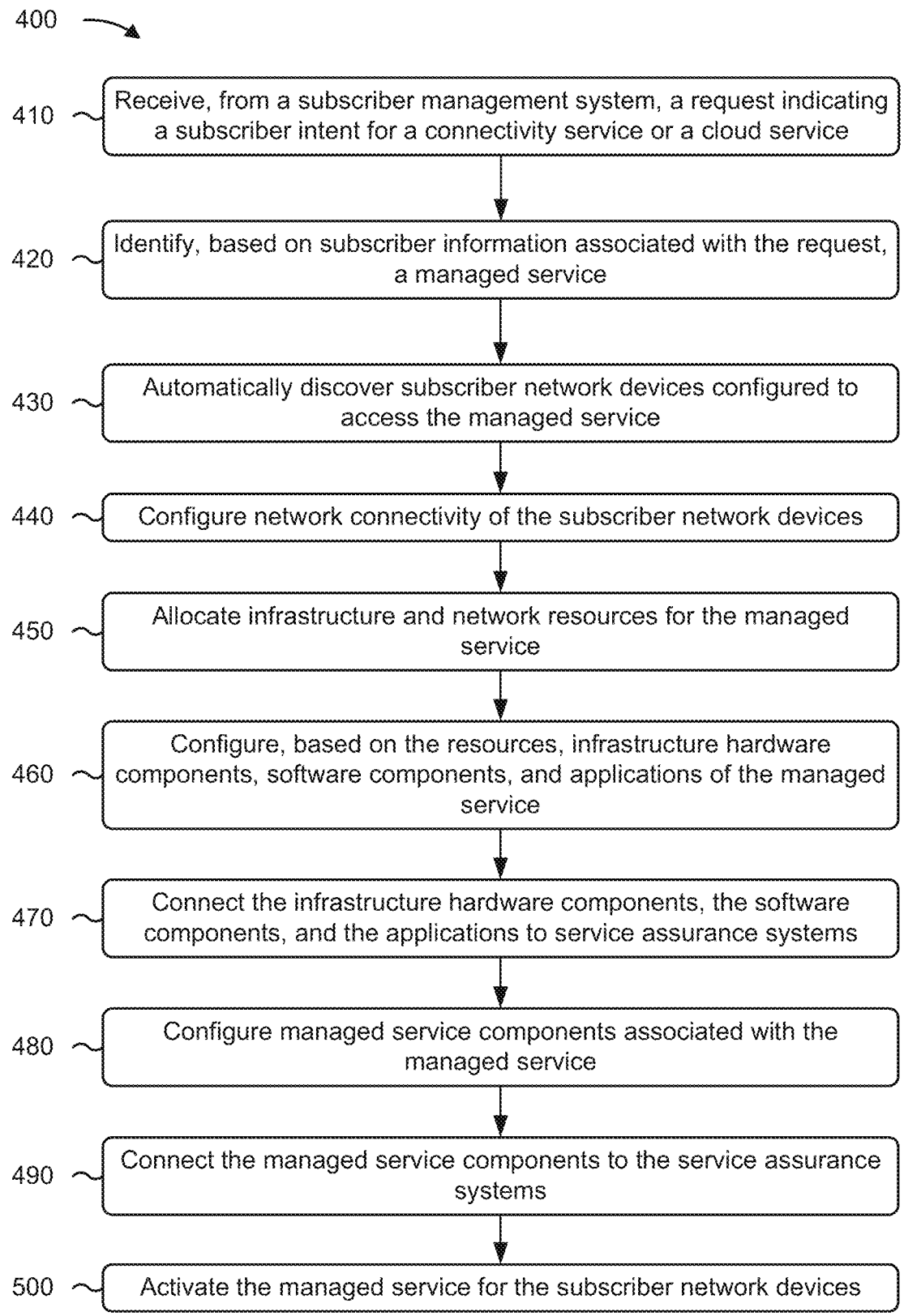
FIG. 4 is a flowchart of an example process relating to autonomous managed services orchestration.

FIG. 4 is a flowchart of an example process 400 relating to autonomous managed services orchestration. In some implementations, one or more process blocks of FIG. 4 may be performed by an orchestration system (e.g., orchestration system 110). In some implementations, one or more process blocks of FIG. 4 may be performed by another device or a group of devices separate from or including the orchestration system, an operation and billing support system (e.g., OSS/BSS 102), a subscriber management system device (e.g., subscriber management system 138), a partner operation support system (e.g., partner operation support system 134), a partner orchestration system (e.g., partner orchestration system 136), and/or one or more subscriber network devices (e.g., subscriber network devices 132). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a subscriber management system, a request indicating a subscriber intent for a connectivity service or a cloud service (block 405). For example, the orchestration system may receive, from a subscriber management system, a request indicating a subscriber intent for a connectivity service or a cloud service, as described above.

As further shown in FIG. 4, process 400 may include identifying, based on subscriber information associated with the request, a managed service (block 410). For example, the orchestration system may identify, based on subscriber information associated with the request, a managed service, the managed service being provided by a managed service provider, as described above.

In some implementations, the subscriber information (or subscriber intent information) may describe subscriber needs. The subscriber needs include historical data regarding services accessed by the subscriber network devices, connection bandwidth associated with the services, service level agreements associated with the services, and application associated with the services, and wherein identifying the managed service comprises identifying the managed service based on the subscriber needs.

As further shown in FIG. 4, process 400 may include automatically discovering subscriber network devices configured to access the managed service (block 415). For example, the orchestration system may automatically discover subscriber network devices configured to access the managed service, as described above.

As further shown in FIG. 4, process 400 may include configuring network connectivity of the subscriber network devices (block 420). For example, the orchestration system may configure network connectivity of the subscriber network devices, as described above.

As further shown in FIG. 4, process 400 may include allocating infrastructure and network resources for the managed service (block 425). For example, the orchestration system may allocate infrastructure and network resources for the managed service, as described above. In some implementations, allocating the infrastructure and network resources include predicting a size of applications of the managed service, a quantity of the CNFs and the VNFs, and associated virtual machines and containers.

As further shown in FIG. 4, process 400 may include configuring, based on the resources, infrastructure hardware components, software components, and applications of the managed service (block 430). For example, the orchestration system may configure, based on the resources, infrastructure hardware components, software components, and applications of the managed service, as described above.

As further shown in FIG. 4, process 400 may include connecting the infrastructure hardware components, the software components, and the applications to service assurance systems (block 435). For example, the orchestration system may connect the infrastructure hardware components, the software components, and the applications to service assurance systems, as described above.

In some implementations, configuring the hardware components and the software components of the network devices comprises one or more of configuring central processing units of the network devices, configuring memories of the network devices, or configuring virtual machines, containers, and network slices associated with the network devices.

In some implementations, configuring the network connectivity of the network devices comprises one or more of configuring local area network connectivity of the network devices, configuring cellular connectivity of the network devices, configuring Internet connectivity of the network devices, configuring wi-fi connectivity of the network devices, or configuring passive optical network connectivity of the network devices.

In some implementations, configuring the network connectivity of the network devices comprises configuring the network devices to connect with one or more network devices of a cloud operator.

As further shown in FIG. 4, process 400 may include configuring managed service components associated with the managed service (block 440). For example, the orchestration system may configure managed service components associated with the managed service, as described above.

As further shown in FIG. 4, process 400 may include connecting the managed service components to the service assurance systems (block 445). For example, the orchestration system may connect the managed service components to the service assurance systems, as described above.

As further shown in FIG. 4, process 400 may include activating the managed service for the subscriber network devices (block 450). For example, the orchestration system may activate the managed service for the subscriber network devices, as described above.

In some implementations, process 400 includes establishing one or more external network-to-network interfaces between a network of the managed service provider and a network of the cloud operator.

In some implementations, process 400 includes identifying one or more Internet-of-Things (IoT) devices associated with the subscriber device, and connecting the network devices and the IoT devices to a fault detection service.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. Zero trust security is applied at each step of example blocks of process 400.

As used herein, the term "component" is intended to be broadly construed as hardware, firmware, or a combination of hardware and software. It will be apparent that systems and/or methods described herein may be implemented in different forms of hardware, firmware, virtual machine, container, virtualization platform, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   receiving, from a subscriber management system, a request indicating a subscriber intent for a connectivity service or a cloud service;
   identifying, based on subscriber information associated with the request, a managed service,
   the managed service being provided by a managed service provider;
   automatically discovering subscriber network devices configured to access the managed service;
   configuring network connectivity of the subscriber network devices;
   allocating infrastructure and network resources for the managed service;
   configuring, based on the infrastructure and network resources, infrastructure hardware components, software components, and applications of the managed service;
   connecting the infrastructure hardware components, the software components, and the applications to service assurance systems;
   configuring managed service components associated with the managed service;
   connecting the managed service components to the service assurance systems; and
   activating the managed service for the subscriber network devices.

2. The method of claim 1, wherein the subscriber information describes subscriber needs, wherein the subscriber needs include historical data regarding one or more of services accessed by the subscriber network devices, connection bandwidth associated with the services, service level agreements associated with the services, or application associated with the services, and wherein identifying the managed service comprises:
  identifying the managed service based on the subscriber needs.
3. The method of claim 1, wherein configuring the infrastructure hardware components, the software components, and the applications of the managed service comprises one or more of:
  configuring central processing units of the subscriber network devices;
  configuring memories of the subscriber network devices; or
  configuring virtual machines, containers, and network slices associated with the subscriber network devices.
4. The method of claim 1, wherein configuring the network connectivity of the subscriber network devices comprises one or more of:
  configuring local area network connectivity of the subscriber network devices;
  configuring cellular connectivity of the subscriber network devices;
  configuring Internet connectivity of the subscriber network devices;
  configuring wi-fi connectivity of the subscriber network devices; or
  configuring passive optical network connectivity of the subscriber network devices.
5. The method of claim 1, wherein configuring the network connectivity of the subscriber network devices comprises:
  configuring the subscriber network devices to connect with one or more network devices of a cloud operator.
6. The method of claim 5, further comprising:
  establishing one or more external network-to-network interfaces between a network of the managed service provider and a network of the cloud operator.
7. The method of claim 1, further comprising:
  identifying one or more Internet-of-Things (IoT) devices associated with the subscriber network devices; and
  connecting the subscriber network devices and the one or more IoT devices to a fault detection service.
8. An orchestration device, comprising:
  one or more processors configured to:
    receive, from a subscriber management system, a request associated with at least one of a connectivity service or an application of a cloud service,
      wherein the request includes subscriber intent information regarding the at least one of the connectivity service or the application;
    identify a managed service associated with the at least one of the connectivity service or the application,
      wherein the managed service is identified based on the subscriber intent information regarding the at least one of the connectivity service or the application;
    identify subscriber network devices configured to access to the managed service;
    allocate resources for the managed service;
    configure, based on the resources, network connectivity of the subscriber network devices;
    configure, based on the resources, hardware components and software components of the managed service;
    configure, based on the resources, cloud-native network functions (CNFs) and virtual network functions (VNFs); and
    activate the managed service for the subscriber network devices.

9. The orchestration device of claim 8, wherein the one or more processors, to allocate the resources, are configured to:
  predict a capacity of the managed service based on a service level agreement associated with the managed service.
10. The orchestration device of claim 8, wherein the one or more processors, to allocate the resources, are configured to:
  predict a capacity of components associated with network connectivity.
11. The orchestration device of claim 8, wherein the one or more processors, to allocate the resources, are configured to:
  predict a capacity of the hardware components and the software components of the subscriber network devices.
12. The orchestration device of claim 8, wherein the one or more processors, to allocate the resources, are configured to:
  predict a size of applications of the managed service, a quantity of the CNFs and the VNFs, and associated virtual machines and containers.
13. The orchestration device of claim 8, wherein the one or more processors are further configured to:
  predict a network failure associated with the network connectivity; and
  configure components, associated with the network connectivity, to address the network failure.
14. The orchestration device of claim 8, wherein the one or more processors are further configured to:
  predict a failure of one or more of the hardware components or the software components; and
  configure the one or more of the hardware components or the software components to address the failure.
15. A non-transitory computer-readable medium storing a set of instructions, the set of instructions comprising:
  one or more instructions that, when executed by one or more processors of an orchestration device, cause the orchestration device to:
    receive, from a subscriber management system, a request to access a connectivity service or an application of a cloud service;
    identify, based on subscriber information associated with the request, a managed service associated with accessing the connectivity service or the application;
    identify subscriber network devices associated with accessing the connectivity service or the application using the managed service;
    allocate resources for the managed service;
    configure, based on the resources, hardware components and software components of the managed service; and
    activate the managed service for the subscriber network devices.
16. The non-transitory computer-readable medium of claim 15, wherein the one or more instructions, when executed by the one or more processors, further cause the orchestration device to:
  configure, based on allocating the resources, software applications of network functions associated with the managed service,
    wherein the network functions include one or more cloud-native network functions (CNFs) and one or more virtual network functions (VNFs).
17. The non-transitory computer-readable medium of claim 16, wherein the one or more instructions, that cause the orchestration device to allocate the resources, cause the orchestration device to:

predict a quantity of the software applications of the network functions.

18. The non-transitory computer-readable medium of claim 15, wherein the one or more instructions, that cause the orchestration device to identify the managed service, cause the orchestration device to:
  identify the managed service based on subscriber intent information identifying historical data regarding services accessed by the subscriber network devices.

19. The non-transitory computer-readable medium of claim 15, wherein the one or more instructions, that cause the orchestration device to configure the subscriber network devices, cause the orchestration device to:
  configure central processing units of the subscriber network devices;
  configure memories of the subscriber network devices; and
  configure virtual machines and containers of the subscriber network devices.

20. The non-transitory computer-readable medium of claim 15, wherein the one or more instructions, that cause the orchestration device to configure the subscriber network devices, cause the orchestration device to one or more of:
  configure local area network connectivity of the subscriber network devices;
  configure cellular connectivity of the subscriber network devices;
  configure wi-fi connectivity of the subscriber network devices; or
  configure passive optical network connectivity of the subscriber network devices.

* * * * *